United States Patent [19]

Saito et al.

[11] Patent Number: 4,594,169

[45] Date of Patent: Jun. 10, 1986

[54] DRILLING FLUID ADDITIVES

[75] Inventors: Yoshizi Saito; Masaru Nakamura; Toyoshi Iida, all of Gunma; Tsugunori Honda, Ichikawa, all of Japan

[73] Assignee: Japan Metals and Chemicals Co., Ltd., Tokyo, Japan

[21] Appl. No.: 678,840

[22] Filed: Dec. 6, 1984

[30] Foreign Application Priority Data

Jun. 22, 1984 [JP] Japan ................. 59-128972

[51] Int. Cl.[4] ............................. C09K 7/02
[52] U.S. Cl. ................ 252/8.5 C; 252/8.5 A; 530/506; 556/28
[58] Field of Search ............. 252/8.5 A, 8.5 C; 530/506

[56] References Cited

U.S. PATENT DOCUMENTS

| 2,813,826 | 11/1957 | Crowley et al. | 252/8.5 |
| 4,220,585 | 9/1980 | Jauora et al. | 252/8.5 |
| 4,235,727 | 11/1980 | Firth | 252/8.5 |
| 4,235,728 | 11/1980 | Schulz et al. | 252/8.5 |

FOREIGN PATENT DOCUMENTS 576739  5/1959  Canada ................. 252/8.5

Primary Examiner—Herbert B. Guynn
Attorney, Agent, or Firm—Parkhurst & Oliff

[57] ABSTRACT

Drilling fluid additives are prepared by complexing humic acids and/or lignins, with three compounds of zirconium, nickel and iron. The metal composition of the additives is 1.3 to 2.5% of zirconium, 0.8 to 1.5% of nickel and 0.8 to 1.5% of iron, and is totally 3.0 to 5.5%. Thus, the drilling fluid additives, containing no chromium, can be used in wide temperature range for the drilling of oil, geothermal or gas wells with less gelation even by various contamination and cause no serious environmental pollution.

2 Claims, No Drawings

DRILLING FLUID ADDITIVES

BACKGROUND OF THE INVENTION

This invention relates to improved chromium-free additives for water-clays based drilling fluids in the drilling of oil, geothermal or gas wells.

For the drilling of oil or geothermal wells, at present, chromium-iron lignosulfonate, chromium humate, their combinations or the like substances are mainly used as additives for the water-clays based drilling fluids (hereinafter termed as "additives"), performing excellent advantages.

However, since the additives contain chromium, they tend to be recently restricted in use from the aspect of environmental pollution. Thus, the additives, which cause no serious pollution in the environment, are strongly desired to be developed instead of the above-mentioned high performance chromium-containing additives.

In chromium free additives, there are a mixture of sodium humate, potassium humate and natural fossil resin, and sodium and/or potassium humate and/or lignosulfonate partially complexed with zirconium compound or zirconium compound and iron compound. However, these various chromium-free additives have small stability to high temperature, and small action of dispersion and peptization. Therefore, the drilling mud containing the additives tends to increase its viscosity to gel formation by high temperature, increasing solid content or various contaminations such as sodium chloride and cements, thereby resulting in difficulties in drilling wells.

SUMMARY OF THE INVENTION

Accordingly, an object of the present invention is to provide improved drilling fluid additives which are free from harmful heavy metals such as chromium and so on, and are adapted for drilling works in wide temperature range and maintain satisfactory rheological properties even in the presence of various contaminations, without causing serious environmental pollution.

According to the present invention, the improved additives may comprise humic acids such as natural or regenerated humic acid (which is produced by oxidation of lignites), and/or lignins such as lignosulfonic acid or salts thereof, and three compounds of zirconium, nickel and iron. Humic acid and lignin are complexed by the three metal compounds.

The reason for using all the three compounds of zirconium, nickel and iron is as follows: It is considered that, since bio-polymer such as humic acid or lignin contain various functional groups (carboxyl, phenolic hydroxyl, alcoholic hydroxyl and carbonyl groups, but not limited to these groups) distributed at various positions in the molecule, a number of metallic compounds react with various ligands in the bio-polymer to be able to form strong chelate bond respectively, thereby increasing the stability of the whole molecule and its adsorption strength to clay particles. Considering the highly-complex structure of the polymer, it is difficult for only a specific metallic compound to associate with various functional groups, which are reactive with metal ions and hydrolic oxide ones, existing at the various relationships of their positions, and to make all the bonds formed strong.

Therefore, the present invention uses the three compounds of zirconium, nickel and iron, each of which is more effective as chelating agent for the additives than each of many other metallic compounds and is not so harmful in the environment, and the three metallic compounds react with the base polymer of humic acids and/or lignins to uniformly form the strong chelate bond with many functional groups, existing uniformly at various positions in the base polymer molecule.

The humic acids herein referred to denote natural or regenerated humic acid, and the lignins herein referred to denote ligno sulfonic acids or their salts.

The zirconium compounds, nickel compounds and iron compounds denote sulfates, nitrates, carbonates, halides and hydroxides of these metals. These compounds readily react in their aqueous solutions with humic acids or lignins to produce complex compounds.

A process for producing the drilling fluid additive of the present invention is as follows: The additive is produced by adding zirconium, nickel and iron compounds to an aqueous solution of humic acids, lignins or their mixtures, and agitating the mixture solution containing base polymer and three metallic compounds at an arbitrary temperature, then adjusting its pH to 8 to 10.5 with alkaline compounds such as NaOH or KOH, and reacting it at arbitrary temperatures, preferably 70° to 90° C. The additive is in the form of solution or is usually dried into powder, and is used for drilling works.

DESCRIPTION OF THE PREFERRED EMBODIMENTS

The inventors of the additives carried out the following experiment so in order to obtain the optimum ratio of zirconium, nickel and iron, added to the base polymer of humic acids and/or lignins.

EXPERIMENT 1

The additives were prepared by using zirconium sulfate tetra hydrate, nickel sulfate hexahydrate, and ferrous (I) sulfate hepta hydrate at their various ratios, and the mixture of ligno-sulfonic soda and regenerated humic acid produced by nitric acid oxidation of lignite (termed nitro-humic acid) as the base polymer.

The percentage of the total content of the three metals in the additives ranges 3% to 4.5%.

Drilling fluids were prepared by 32 g (8%) bentonite swelling in 400 ml of water and 12 g (3%) of the additives in accordance with API (American Petroleum Institute) Recommended Practice RP13B, and the fluids were aged at 120° C. for 16 hrs in a roller oven and then cooled to 30° C.

Of the prepared fluids and the ages ones were measured the apparent viscosity (AV, cp), yield value (YV, 1b/100 ft$^2$), 10 sec. gel strength (GS$_0$, 1b/100 ft$^2$) and 10 min. gel strength GS$_{10}$, 1b/100 ft$^2$). The results are shown in Table 1.

Regenerative humic acid and lignosulfonic soda were used at a ratio of 2:1 (wt/wt).

TABLE 1

| No. | Percentages of metal contents in the additive | | | | Initial properties | | | | After aging 16 hrs at 120° C. | | | |
|---|---|---|---|---|---|---|---|---|---|---|---|---|
| | Zr | Ni | Fe | Total | AV | YV | $GS_0$ | $GS_{10}$ | AV | YV | $GS_0$ | $GS_{10}$ |
| 1 | 1 | 1 | 1 | 3 | 15 | 4 | 3 | 6 | 34 | 32 | 4 | 7 |
| 2 | 1 | 1 | 1.5 | 3.5 | 13 | 4 | 2 | 2.5 | 24 | 14 | 3 | 4.5 |
| 3 | 1 | 1 | 2 | 4 | 10.5 | 4 | 1 | 1.5 | 23 | 11 | 1.5 | 2.5 |
| 4 | 1 | 1 | 2.5 | 4.5 | 12 | 3 | 1.5 | 3 | 29 | 22 | 2 | 3.5 |
| 5 | 1 | 1.5 | 1 | 3.5 | 12.5 | 3 | 2 | 3.5 | 26 | 14 | 2 | 3 |
| 6 | 1 | 2 | 1 | 4 | 12 | 2 | 2 | 6 | 23 | 13 | 1.5 | 2 |
| 7 | 1 | 2.5 | 1 | 4.5 | 12 | 2 | 2.5 | 9 | 24 | 14 | 1.5 | 2.5 |
| 8 | 1.5 | 1 | 1 | 3.5 | 12 | 2 | 1 | 1.5 | 19 | 10 | 1.5 | 1.5 |
| 9 | 2 | 1 | 1 | 4 | 12 | 2 | 1 | 1.5 | 17 | 7 | 1 | 1.5 |
| 10 | 2.5 | 1 | 1 | 4.5 | 13 | 2 | 1 | 1.5 | 20 | 9 | 1 | 1.5 |

(Note)
AV is representd by cp; YV, $GS_0$, $GS_{10}$ are by lb/100 ft$^2$. The same as in the following Tables.

From the results in Table 1, when the percentage of zirconim is 1%, all the values of AV after aging are 20 cp or higher, which are not always preferable, but when the percentage of zirconium is 1.5% or higher, the values of AV are 20 cp or less.

EXPERIMENT 2

Then, the percentage of the total content of the three metal components in the fluid additives was set to 4%. The percentages of zirconium, nickel and iron contents were set to the ranges of 1.4% to 3.0%, 0.4% to 2.0% and 0.4% to 1.8%, respectively. The drilling fluid additives were prepared, using the same materials, in the same manner as the Experiment 1, and were tested. The results are shown in Table 2.

TABLE 2

| No. | Percentages of metal contents in the additives | | | | Initial properties | | | | After aging 16 hrs at 120° C. | | | |
|---|---|---|---|---|---|---|---|---|---|---|---|---|
| | Zr | Ni | Fe | Total | AV | YV | $GS_0$ | $GS_{10}$ | AV | YV | $GS_0$ | $GS_{10}$ |
| 11 | 3.0 | 0.5 | 0.5 | 4 | 11 | 3 | 2 | 4 | 25 | 15 | 1.5 | 3 |
| 12 | 2.6 | 1.0 | 0.4 | 4 | 12 | 4 | 1.5 | 3 | 24 | 14 | 1.5 | 3 |
| 13 | 2.6 | 0.6 | 0.8 | 4 | 12 | 4 | 1.5 | 2.5 | 23 | 10 | 1.5 | 3 |
| 14 | 2.2 | 1.2 | 0.6 | 4 | 13 | 4 | 1.5 | 3 | 19 | 7 | 2 | 3 |
| 15 | 2.2 | 0.8 | 1.0 | 4 | 12 | 2 | 1 | 1.5 | 17 | 6 | 1.5 | 1.5 |
| 16 | 2.2 | 0.4 | 1.4 | 4 | 13 | 4 | 2 | 2 | 24 | 11 | 2.5 | 3 |
| 17 | 1.8 | 1.6 | 0.6 | 4 | 12 | 2 | 1 | 2 | 21 | 10 | 2 | 2 |
| 18 | 1.8 | 1.2 | 1.0 | 4 | 12 | 2 | 1 | 1.5 | 15 | 5 | 1 | 1.5 |
| 19 | 1.8 | 0.8 | 1.4 | 4 | 13 | 4 | 1 | 2 | 18 | 8 | 1 | 2 |
| 20 | 1.8 | 0.4 | 1.8 | 4 | 11 | 2 | 1 | 2 | 23 | 14 | 3.5 | 5 |
| 21 | 1.4 | 2.0 | 0.6 | 4 | 13 | 2 | 1.5 | 2.5 | 24 | 13 | 2.5 | 3 |
| 22 | 1.4 | 1.6 | 1.0 | 4 | 11 | 2 | 1.5 | 2.5 | 20 | 10 | 2 | 2.5 |
| 23 | 1.4 | 1.2 | 1.4 | 4 | 12 | 2 | 2 | 3 | 19 | 7 | 1 | 2 |
| 24 | 1.4 | 0.8 | 1.8 | 4 | 11 | 4 | 2 | 4 | 29 | 18 | 4 | 6.5 |

As clearly understood from Table 2, the preferable percentages of, zirconium, nickel and iron contents in the additives are 1.4 to 2.2%, 0.8 to 1.5% and 0.8 to 1.5%, respectively. Particularly, it is obvious that the additives containing 1.8% of zirconium, around 1.0% of iron and around 1.0% of nickel have much better results than others have.

EXPERIMENT 3

Then, the influence of a variations in the total content of the three metals in the additives was examined in a case where the weight ratios of zirconium, nickel and iron were 1.8:1.2:1.0. The additives were prepared, using the same materials, in the same manner as Experiment 1. The results are shown in Table 3.

TABLE 3

| No. | Percentages of metal contents in the additives | | | | Initial properties | | | | After aging 16 hrs at 120° C. | | | |
|---|---|---|---|---|---|---|---|---|---|---|---|---|
| | Zr | Ni | Fe | Total | AV | YV | $GS_0$ | $GS_{10}$ | AV | YV | $GS_0$ | $GS_{10}$ |
| 25 | 0.7 | 0.5 | 0.3 | 1.5 | 12 | 4 | 3 | 9 | 45 | 46 | 6 | 11 |
| 26 | 0.9 | 0.6 | 0.5 | 2 | 11 | 2 | 2 | 4.5 | 30 | 22 | 4.5 | 9 |
| 27 | 1.1 | 0.8 | 0.6 | 2.5 | 12 | 2 | 2.2 | 4 | 27 | 20 | 2 | 6 |
| 28 | 1.3 | 0.9 | 0.8 | 3 | 12 | 2 | 1.5 | 2 | 17.5 | 9 | 1 | 2 |
| 29 | 1.6 | 1.0 | 0.9 | 3.5 | 12 | 4 | 1 | 2 | 16 | 6 | 1 | 1.5 |
| 30 | 1.8 | 1.2 | 1.0 | 4 | 12 | 2 | 1 | 1.5 | 15 | 5 | 1 | 1.5 |
| 31 | 2.0 | 1.4 | 1.1 | 4.5 | 13 | 2 | 1 | 2 | 16 | 6 | 1 | 1.5 |
| 32 | 2.3 | 1.5 | 1.2 | 5 | 14 | 5 | 1.5 | 2.5 | 17 | 8 | 1.5 | 2 |
| 33 | 2.5 | 1.7 | 1.3 | 5.5 | 14.5 | 7 | 1.5 | 3 | 19 | 10 | 2 | 3 |
| 34 | 2.7 | 1.8 | 1.5 | 6 | 16 | 8 | 3 | 8 | 29 | 23 | 3 | 5.5 |

As clearly shown in Table 3, even in the case that the ratios of zirconium, nickel and iron contents are 1.8:1.2:1, it is recognized that if the total content of these metals is less than 3% or more than 5.5%, the values of AV after aging are 20 cp or higher, and the YV and $GS_{10}$ are higher, also.

From the results of the Experiments 1 to 3, it is found that the preferable percentages of each metal content in the additives are 1.3 to 2.5% of zirconium, 0.8 to 1.5% of nickel and 0.8 to 1.5% of iron, and the preferable total percentage is 3.0 to 5.5%. The additives which have the metal compositions mentioned above show much better rheology properties than the others do.

The results of the Experments described above were similar to those of the case that lignins or humic acids were used as base polymer.

The reason why the good results are obtained by adding the zirconium, nickel and iron compounds to the base polymer is that each of the three types of metallic compounds selectively reacts with the more reactive portion in various ligands in the base polymer, as described above, forming a uniform and strong metal-organic polymer complex which is reacted with the various functional groups in the base polymer, with increasing stabilization of the entire molecule of the base polymer and increasing strength of the bond with clay particles, and consequently, the complex having the mutual effects of these three compounds shows excellent performance as the drilling fluid additives.

Since the drilling fluid additives of the present invention do not contain chromium compound at all, no environmental pollution occurs due to the chromium as in the prior art, and therefore, the additives can be widely utilized for the drilling of various wells.

EXAMPLE 33 g of nitrohumic acid and 67 g of sodium lignosulfonate (Lignaconc NP100A produced by JUJO MFG. CO., LTD. JAPAN) were added into 300 ml of water and mixed at 60° C. for 30 min. Then, 8.7 g of zirconium sulfate tetra hydrate, 6.6 g of nickel sulfate hexa hydrate and 6.2 g of ferrous (I) sulfate hepta hydrate were added to the mixture. The resultant mixture was stirred at 70° C. for 15 min, and then, prepared to pH 9.5 with 20% aqueous solution of sodium hydroxide, followed by being stirred at 80° C. for 30 min. Then, the mixture was dried at 105° C. in the oven (hereinafter shall be referred to as sample A). The sample A contains 1.8% of zirconium, 1.2% of nickel, and 1.1% of iron.

Subsequently, the sample A was tested as a drilling additive in combinations as listed in Table 4 in accordance with API Recommended Practice RP13B. The aging test was conducted for 16 hrs.

TABLE 4

| No. | Drilling fluid additive (g) | Bentonite powder (g) | Cement (g) | Calcined plaster (g) | Barite (g) | NaCl (g) | Paigeite powder (g) | Aging temp. (°C.) |
|---|---|---|---|---|---|---|---|---|
|  | Suspension of 8% swelled bentonite (ml) |  |  |  |  |  |  |  |
| 1 | 400 | 12 | — | — | — | — | — | — | 100 |
| 2 | 400 | 12 | — | — | — | — | — | — | 120 |
| 3 | 400 | 12 | — | — | — | — | — | — | 150 |
| 4 | 400 | 12 | 20 | — | — | — | — | — | 100 |
| 5 | 400 | 12 | — | 4 | — | — | — | — | 100 |
| 6 | 400 | 12 | — | — | 1 | — | — | — | 100 |
| 7 | 400 | 12 | — | — | — | 480 | — | — | 100 |
| 8 | 400 | 12 | — | — | — | — | 4 | — | 100 |
| 9 | 400 | 12 | — | — | — | — | — | 40 | 100 |
|  | Suspension of 10% swelled bentonite (ml) |  |  |  |  |  |  |  |
| 10 | 400 | 12 | — | — | — | — | — | — | 120 |

The fluid tested was prepared as follows. The sample A was added to aqueous suspension (8% of solid content) of bentonite, swelled in a mixer for 2 days, and the resultant mixture was stirred for 3 min, followed by adjusting to pH 10.0 with 20% aqueous solution of sodium hydroxide. Bentonite powder, cement, calcined plaster, barite, Nacl or paigeite powder was added to the aqueous suspension of swelled bentonite on the stir in a mixer after 1 min from the time of the addition of the additive. The results are shown in Table 5. For the comparison with the results of the additive of the present invention, those of the combination (hereinafter shall be referred to as sample X) of chromium-iron complex of sodium lignosulfonate and chromium complex of sodium humate, and those of the combination (hereinafter shall be referred to as sample Y) of zirconium complexes of sodium humate and zirconium complex of the sodium lignosulfonate are also shown in Table 5.

TABLE 5

| Test No. |  |  | Sample name | | |
|---|---|---|---|---|---|
|  |  |  | A | X | Y |
| 1 | Initial | YV | 1.0 | 1.0 | 3.0 |
|  |  | $GS_{10}$ | 1.0 | 1.0 | 2.0 |
|  |  | AV | 10.5 | 12 | 18.5 |
|  |  | YV | 1 | 2 | 9 |
|  | After aging | $GS_0$ | 0.5 | 0.5 | 1.5 |
|  | 16 hrs | $GS_{10}$ | 1.0 | 1.0 | 2.0 |
|  |  | WL | 5.5 | 4.8 | 4.5 |
|  |  | FC | 1 | 1 | 1 |
| 2 | Initial | YV | 1.0 | 1.0 | 3.0 |
|  |  | $GS_{10}$ | 1.0 | 1.0 | 2.0 |
|  |  | AV | 16 | 17 | 24.5 |
|  |  | YV | 4 | 5 | 14 |
|  | After aging | $GS_0$ | 1.0 | 1.0 | 2.0 |
|  | 16 hrs | $GS_{10}$ | 1.5 | 1.5 | 3.0 |
|  |  | WL | 5.0 | 5.2 | 5.2 |
|  |  | FC | 1 | 1 | 1 |
| 3 | Initial | YV | 1.0 | 1.0 | 3.0 |
|  |  | $GS_{10}$ | 1.0 | 1.0 | 2.0 |
|  |  | AV | 32.5 | 36 | 43.5 |
|  |  | YV | 25 | 24 | 41 |
|  | After aging | $GS_0$ | 1.5 | 1.5 | 2.5 |
|  | 16 hrs | $GS_{10}$ | 2.0 | 2.0 | 5.0 |
|  |  | WL | 5.0 | 5.2 | 5.8 |
|  |  | FC | 1 | 1 | 1 |
| 4 | Initial | YV | 20 | 19 | 27 |
|  |  | $GS_{10}$ | 6.0 | 6.0 | 9.0 |
|  |  | AV | 99.5 | 105 | 110.5 |
|  |  | YV | 76 | 99 | 76 |
|  | After aging | $GS_0$ | 6 | 5.5 | 8 |
|  | 16 hrs | $GS_{10}$ | 7.5 | 7 | 10 |
|  |  | WL | 4.3 | 4.9 | 5.4 |
|  |  | FC | 1 | 1 | 1 |
| 5 | Initial | YV | 5 | 7 | 11 |

TABLE 5-continued

| Test No. | | | Sample name | | |
|---|---|---|---|---|---|
| | | | A | X | Y |
| | | $GS_{10}$ | 1.5 | 4.0 | 2.5 |
| | | AV | 28 | 63 | 36.5 |
| | | YV | 8 | 44 | 19 |
| | After aging 16 hrs | $GS_0$ | 1.0 | 2.5 | 1.0 |
| | | $GS_{10}$ | 1.0 | 4.0 | 1.5 |
| | | WL | 4.6 | 7.9 | 4.8 |
| | | FC | 1 | 1.5 | 1.5 |
| 6 | Initial | YV | 6 | 2 | 4 |
| | | $GS_{10}$ | 2.5 | 1.5 | 5 |
| | | AV | 20 | 19 | 25 |
| | | YV | 8 | 8 | 16 |
| | After aging 16 hrs | $GS_0$ | 1.0 | 0.5 | 1.0 |
| | | $GS_{10}$ | 1.0 | 1.0 | 2.0 |
| | | WL | 4.4 | 4.3 | 4.5 |
| | | FC | 1 | 1 | 1 |
| 7 | Initial | YV | 5 | 4 | 5 |
| | | $GS_{10}$ | 2.0 | 1.5 | 3.0 |
| | | AV | 28.5 | 25.5 | 35.5 |
| | | YV | 3 | 2 | 11 |
| | After aging 16 hrs | $GS_0$ | 1.0 | 0.5 | 1.5 |
| | | $GS_{10}$ | 1.5 | 1.0 | 1.5 |
| | | WL | 4.2 | 5.8 | 7.7 |
| | | FC | 2 | 6 | 6 |
| 8 | Initial | YV | 5 | 2 | 5 |
| | | $GS_{10}$ | 4 | 5 | 10 |
| | | AV | 20 | 20 | 30.5 |
| | | YV | 8 | 6 | 21 |
| | After aging 16 hrs | $GS_0$ | 1.0 | 0.5 | 2.5 |
| | | $GS_{10}$ | 1.5 | 1.0 | 3.5 |
| | | WL | 4.5 | 5.0 | 6.4 |
| | | FC | 1 | 1 | 1 |
| 9 | Initial | YV | 2 | 3 | 4 |
| | | $GS_{10}$ | 2.5 | 2 | 3.5 |
| | | AV | 16 | 17 | 35.5 |
| | | YV | 5 | 6 | 11 |
| | After aging 16 hrs | $GS_0$ | 1 | 1 | 1.5 |
| | | $GS_{10}$ | 1.5 | 1.5 | 2.0 |
| | | WL | 4.7 | 5.9 | 5.7 |
| | | FC | 1 | 2 | 1.5 |
| 10 | Initial | YV | 8 | 7 | 8 |
| | | $GS_{10}$ | 3.0 | 3.0 | 4.0 |
| | | AV | 31 | 32 | 40 |
| | | YV | 16 | 16 | 30 |
| | After aging 16 hrs | $GS_0$ | 2.0 | 1.5 | 2.5 |
| | | $GS_{10}$ | 2.5 | 2.0 | 3.5 |
| | | WL | 4.2 | 4.9 | 5.4 |
| | | FC | 1 | 1 | 1 |

In Table 5, WL represents the water loss (ml) of the fluid after aging, and FC represents the thickness (mm) of the filter cake.

As shown in Table 5, the drilling fulid additive (A) of the present invention has excellent initial dispersibility and excellent thermal stability which makes possible the drilling of wells under high temperature, and has the improved low structural viscosity.

From the results of the various contamination tests, using cement, paigeite, gypsum, salt or bentonite, the rheology properties of the fluid containing sample A were generally much better than those of sample Y, and compared to those of sample X. As apparent from No. 7 in Table 5, in the case of the drilling fluid of high specific gravity, the WL of the fluid containing sample A is less than that of the fluid containing sample X or Y, and the FC of the fluid containing sample A is thin, indicating that sample A is better with regard to wall building properties.

These results indicate that the drilling fluid additives of the present invention are suitable as the dispersion-peptization agent of the mud-containing fluid for the drilling of an oil well, as well as geothermal and gas wells.

What is claimed is:

1. A drilling fluid additive, comprising:
complex compounds of nitro-humic acids and lignosulfonates and compounds of metals zirconium, nickel and iron, said compounds of metals being sulfates, nitrates, halides, carbonates and hydroxides of said metals, wherein the contents of said metals in said additive are 1.3 to 2.5% of zirconium, 0.8 to 1.5% of nickel and 0.8 to 1.5% of iron, the total metal content being 3.0 to 5.5% of said drilling fluid additive.

2. The drilling fluid additive according to claim 1, wherein the contents of said metals are 1.4 to 2.2% of zirconium, 0.8 to 1.5% of nickel and 0.8 to 1.5% of iron.

* * * * *